Jan. 12, 1965 W. GOHLKE 3,165,281
ELASTIC FOLDING CONTROL SURFACES FOR AERODYNES
Filed July 2, 1963
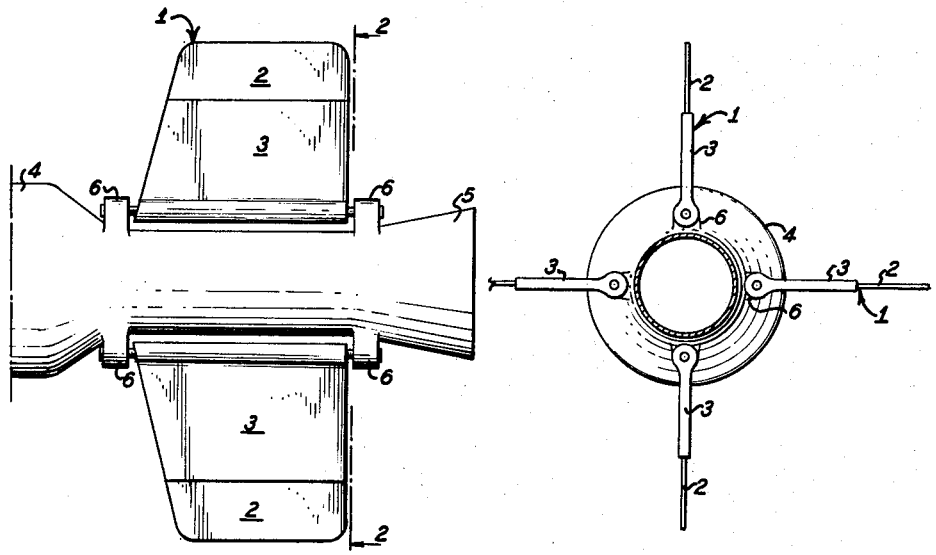
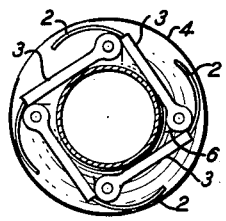
INVENTOR
WERNER GOHLKE

United States Patent Office 3,165,281
Patented Jan. 12, 1965

3,165,281
ELASTIC FOLDING CONTROL SURFACES FOR AERODYNES
Werner Gohlke, J.v. Eichendorffstrasse 8, Guls, Germany
Filed July 2, 1963, Ser. No. 292,364
Claims priority, application Germany, July 11, 1962, G 35,435
6 Claims. (Cl. 244—49)

This invention relates to aerodynes and more particularly to elements providing control surfaces for aerodynes.

Wing-stabilized aerodynes are generally provided with control surfaces elements which extend during flight beyond the outer diameter of the aerodyne's body. This is necessary in order that they can extend into the undisturbed flow which surrounds an aerodyne in flight. Control surface diameters are sometimes necessary which may amount to a multiple of the diameter of the aerodyne. However, such large control surface diameters are troublesome when starting the aerodyne in flight, particularly from a tube which must be provided, in case of rigid control surfaces, with longitudinal recesses to insure proper direction for the aerodyne in spite of the protruding control surface wings.

In order to avoid this disadvantage, it is known to use folding control surfaces. These folding control surfaces must be such that they lie in folded state within the starting tube and only after the aerodyne has emerged from the tube should they unfold in order to act thereafter as a stabilizing device for the aerodyne. Folding control surface constructions are known which comply with these requirements. They use, among other features, curved wings in the shape of cylinder jacket pieces which are either curved, for their full length, in the shape of a circular cylinder or also other shapes and the interior surface of which adjacent the aerodyne is plane. Only the outer part is curved in such a manner that it is adapted to the curvature of the starting tube wall. Thereby the wing may be so long that its outer end in the folded-in state extends around the bearings of the neighbouring wing. The structure of the control surface wings is, thereby, often of such a type that the part adjacent to the aerodyne, viz the foot of the wing is reinforced for purposes of its connection with the holding arrangement which is parallel to the axes of the aerodyne. Wings of this kind, however, have always been too rigid in themselves so that, after folding-out into flight position, they maintain their original form. Furthermore, there are also used wings which are collapsible in themselves in order to arrange them within the section of the starting tube, whereby their foldability is obtained by one or several hinge articulations. Such arrangements are considerably heavier than rigid control surfaces, and also their flow resistance of the control surfaces and thus that of the aerodyne is considerably increased. Thereby the flight distance is considerably shortened, particularly in connection with bodies flying without any driving arrangement. This is the case particularly if the control surface diameter must be large. Another known design of folding control surfaces uses elastic sheet metals of constant thickness arranged directly on the aerodyne which are wound before flight around the aerodyne arranged in its starting tube. Shortly after the starting process they unfold. These control surfaces have the disadvantage that they are not rigid enough and that, in the wound-up state, they have a tendency toward non-elastic deformations and, during flight, to wing flutter. Wings of this kind are, therefore, occasionally propped by a second propping sheet metal consisting of spring sheet metal which can be likewise folded. In this case too, the flow resistance is very large.

The present invention avoids these disadvantages, particularly the increased flow resistance, and allows arranging the control surface easily within a tube section. The advantages of the invention are also obtained if the diameter of control surfaces associated with very long aerodynes must be made so large that the undisturbed flow is reached.

An elastic folding control surface for an aerodyne with folding control surface wings which can be folded within a cylindrical tube surrounding the aerodyne within the space between their own folding axes and the neighboring folding axes which are parallel to the aerodyne axes and which have an outer surface protruding above the neighboring folding axes and adapted to the curvature of the cylindrical body are characterized according to the invention by the fact that the curved outer surfaces consist of elastically flexible material and that they extend them as flat outer surfaces in flight position after the unfolding of the rigid plane interior surfaces.

An embodiment of the invention is shown in the accompanying drawing wherein:

FIGURE 1 shows a lateral view of an arrangement according to the invention; and

FIGURES 2 and 3 are plan views of the control surfaces in an axial direction and in unfolded and folded conditions respectively.

In the drawing are shown folding surfaces according to the invention having four wings and connected to the discharge nozzle 5 of a jet driven aerodyne. There may be additional or fewer wings. The invention can also be used for aerodynes driven in other manners.

According to the drawing, the wings 1 of the folding control surfaces are designed in such a way that the wing extremities 2 are elastically flexible, whereby the wing part 3 adjacent the aerodyne is substantially inelastic or rigid. Each part 3 is pivotally fastened on the aerodyne in bearings 6. During flight, parts 2 and 3 can form a straight wing (FIG. 2) having low resistance.

The parts 2 and 3 may consist of similar or diperent material, and the different elastic qualities of both parts can be provided by known measures such as proper shaping or suitable reinforcements. In case of different materials there can be used, for example, aluminum alloy for part 3 and spring sheet metal for part 2. The passage from parts 3 to 2 can be smooth or stepped. In the folded state of FIG. 3 the contours of the tube 4 are not exceeded, as the elastically flexible part 2 of one wing may be wrapped around the bearing 6 of the adjacent wing. By the present invention, large spans of control surfaces may be reached without diminishing, in an inadmissible manner, the rigidity of the full wing.

Thus the present invention avoids the above described disadvantages of designs heretofore known, and, above all, articulations consisting of hinges are avoided within the wing surfaces, which hinge articulations considerably increase the resistance. A use of the invention in fluids other than air (e.g. water) is also possible.

What is claimed is:

1. An aerodyne comprising a generally cylindrical body, a substantially rigid wing part, means pivotally connecting said wing part to said body for movement between an extended position whereat said part is radially aligned relative to said body and a retracted position whereat said part is collapsed against body, and an extension on said wing part to constitute a radial extension thereof, said extension being substantially more elastic than said wing part whereby to facilitate insertion of the aerodyne into a tube.

2. An aerodyne as claimed in claim 1 wherein said wing part and extension are rigidly connected.

3. An aerodyne as claimed in claim 2 wherein the wing part and extension are connected along a line parallel to an axis of symmetry defined by said body.

4. An aerodyne as claimed in claim 2 wherein said body defines an outer peripheral boundary and said wing part is adapted for being pivoted wholly within said boundary in said retracted position.

5. An aerodyne as claimed in claim 2 comprising a further wing part and means pivotally supporting the same on said body, said extension being adapted to be curved around the latter said means with the first said wing part in retracted position.

6. For connection to an aerodyne; a wing comprising a rigid section, means on said section for pivotally coupling the same to said aerodyne, and an elastic extension on said rigid section to constitute a continuation thereof and separated by said section from said means.

References Cited by the Examiner

UNITED STATES PATENTS

| 2,918,235 | 12/59 | Aberg et al. | 244—138 |
| 2,924,175 | 2/60 | Jasse | 102—150 |

FOREIGN PATENTS

| 745,252 | 2/56 | Great Britain. |

MILTON BUCHLER, *Primary Examiner.*

ANDREW H. FARRELL, *Examiner.*